United States Patent
Kim

(10) Patent No.: US 7,956,936 B2
(45) Date of Patent: Jun. 7, 2011

(54) REMOTE CONTROLLER AND IMAGE SYSTEM COMPRISING THE SAME

(75) Inventor: Jae-Hwan Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1280 days.

(21) Appl. No.: 11/541,644

(22) Filed: Oct. 3, 2006

(65) Prior Publication Data

US 2007/0083890 A1    Apr. 12, 2007

(30) Foreign Application Priority Data

Oct. 7, 2005    (KR) ........................ 10-2005-0094552

(51) Int. Cl.
*H04N 5/44*    (2006.01)
(52) U.S. Cl. .......................................... 348/734; 725/38
(58) Field of Classification Search .................. 348/731, 348/732, 725, 726, 554, 734, 558, 565, 569, 348/473, 461, 465; 725/38
See application file for complete search history.

(56) References Cited

U.S. PATENT DOCUMENTS

| | | | |
|---|---|---|---|
| 6,249,320 B1 * | 6/2001 | Schneidewend et al. | 348/569 |
| 6,763,522 B1 * | 7/2004 | Kondo et al. | 725/39 |

FOREIGN PATENT DOCUMENTS

| | | |
|---|---|---|
| CN | 1674647 A | 9/2005 |
| JP | 2002-112127 A | 4/2002 |
| JP | 2002-223396 A | 8/2002 |
| JP | 2002-232794 A | 8/2002 |
| JP | 2003125300 A | 4/2003 |
| KR | 1997-0058222 A | 7/1997 |
| KR | 10-2002-0076597 A | 10/2002 |
| KR | 10-2005-0089631 A | 9/2005 |

\* cited by examiner

*Primary Examiner* — M. Lee
(74) *Attorney, Agent, or Firm* — Sughrue Mion, PLLC

(57) ABSTRACT

An image system includes a digital broadcasting processing apparatus and a remote controller for remotely controlling the digital broadcasting processing apparatus, wherein the remote controller includes a mode switching button for selecting one of a major channel mode and a minor channel mode, a channel search button for sequentially searching major channels and minor channels depending on the selected channel mode, and a radio transmitter which wirelessly transmits information about selection of the mode switching if the mode switching button is selected or information about a searched channel if the channel search button is selected, to a radio receiver. Further, the digital broadcasting processing apparatus includes the radio receiver which wirelessly receives the information and a channel controller which switches a channel mode tuned based on the information on the selection of the mode switching.

18 Claims, 5 Drawing Sheets

REMOTE CONTROLLER AND IMAGE SYSTEM COMPRISING THE SAME

CROSS-REFERENCE TO RELATED APPLICATIONS

This application claims the benefit of Korean Patent Application No. 2005-0094552, filed on Oct. 7, 2005, in the Korean Intellectual Property Office, the disclosure of which is incorporated herein by reference.

BACKGROUND OF THE INVENTION

1. Field of the Invention

The present invention relates to a remote controller and an image system comprising the same, and more particularly, to a remote controller for remotely controlling a digital broadcasting processing apparatus that receives broadcasting signals corresponding to major channels and minor channels, and an image system comprising the same.

2. Description of the Related Art

With the wide spread of digital broadcasting, users have an opportunity to select more channels. Unlike existing analog broadcasting, since the digital broadcasting can transmit broadcasting signals corresponding to a plurality of channels using one frequency band, the number of channels which can be selected by the users has greatly increased.

Since three or four minor channels may be contained in one major channel, it is necessary for a user to operate up/down buttons provided in a remote controller too frequently in order to select a desired channel.

At present, remote controllers in domestic use for digital broadcasting processing apparatuses have problems in that users have to input major channels and minor channels one by one, or buttons for selecting the digital broadcasting should be separately used. That is, there arise problems of difficulty in user's operation of buttons and troublesomeness in selecting a desired channel.

SUMMARY OF THE INVENTION

Illustrative, non-limiting exemplary embodiments of the present invention overcome the above disadvantages, and other disadvantages not described above.

The present invention provides a remote controller allowing a user to select a channel without difficulty, and an image system comprising the same.

According to an aspect of the present invention, there is provided an image system which comprises a digital broadcasting processing apparatus and a remote controller for remotely controlling the digital broadcasting processing apparatus, wherein the remote controller comprises a mode switching button for selecting one of a major channel mode and a minor channel mode, a channel search button for sequentially searching major channels and minor channels depending on the selected channel mode, and a radio transmitter for transmitting information about selection of the mode switching when the mode switching button is selected or information about a searched channel when the channel search button is selected, by wireless, to the digital broadcasting processing apparatus, and the digital broadcasting processing apparatus comprises a radio receiver for receiving the information by wireless and a channel controller for switching a channel mode to be tuned based on the information about the selection of the mode switching.

The current channel mode may be switched to a channel mode different from the current channel mode when the mode switching button is selected and the channel search button is selected before a predetermined period of time elapses.

According to another aspect of the present invention, there is provided a remote controller for remotely controlling an external digital broadcasting processing apparatus having a radio receiver, the remote comprising a mode switching button for selecting one of a major channel mode and a minor channel mode; a channel search button for sequentially searching major channels and minor channels depending on the respective channel modes; and a radio transmitter for transmitting information about selection of the mode switching when the mode switching button is selected or information about a searched channel when the channel search button is selected, by wireless, to the radio receiver.

According to still another aspect of the present invention, there is provided an image system which comprises a digital broadcasting processing apparatus and a remote controller for remotely controlling the digital broadcasting processing apparatus, wherein the remote controller comprises a major channel search button for sequentially searching major channels in a predetermined order, a minor channel search button for sequentially searching minor channels in a predetermined order, and a radio transmitter for transmitting information about a searched major channel or a searched minor channel when the major channel search button or the minor channel search button is selected, by wireless, to the digital broadcasting processing apparatus, and wherein the digital broadcasting processing apparatus comprises a radio receiver for receiving the information by wireless, and a channel controller for tuning the searched major channel or the searched minor channel based on the information about the searched major channel or the information about the searched minor channel.

The remote controller may comprise a mode switching button for selecting one of a major channel mode for searching the major channels and a minor channel mode for searching the minor channels, and the channel controller switches a channel mode to be tuned based on information about selection of mode switching.

According to yet another aspect of the present invention, there is provided a remote controller for remotely controlling an external digital broadcasting processing apparatus having a radio receiver, the remote controller comprising: a major channel search button for sequentially searching major channels in a predetermined order; a minor channel search button for sequentially searching minor channels in a predetermined order; and a radio transmitter for transmitting information about a searched major channel or a searched minor channel when the major channel search button or the minor channel search button is selected, by wireless, to the radio receiver.

The remote controller may further comprise a mode switching button for selecting one of a major channel mode for searching the major channels and a minor channel mode for searching the minor channels, and wherein the radio transmitter transmits information about the selection of mode switching, by wireless, to the radio receiver.

BRIEF DESCRIPTION OF THE DRAWINGS

The above and/or other aspects of the present invention will become apparent and more readily appreciated from the following description of the embodiments, taken in conjunction with the accompanying drawings of which.

DETAILED DESCRIPTION OF THE EXEMPLARY EMBODIMENTS OF THE INVENTION

Reference will now be made in detail to exemplary embodiments of the present invention, examples of which are illustrated in the accompanying drawings.

Figure 1:
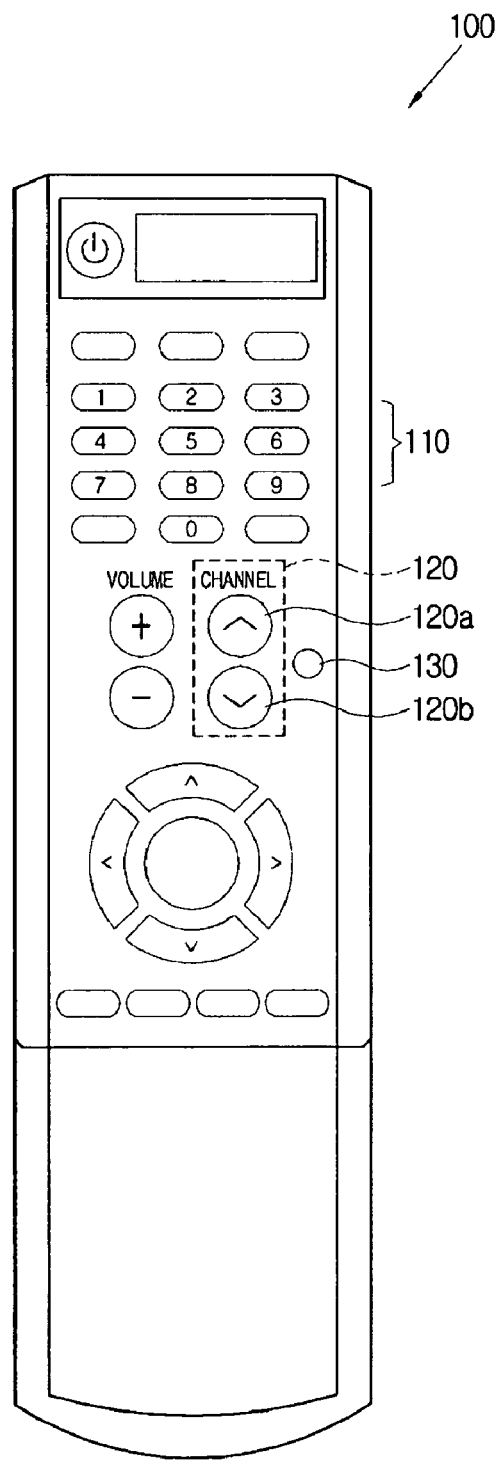
FIG. 1 is a front view of a remote controller according to a first exemplary embodiment of the present invention.

FIG. 1 is a front view of a remote controller 100 according to a first exemplary embodiment of the present invention. As shown in FIG. 1, the remote controller 100 includes channel input buttons 110 for input of channels, a channel search button 120, a mode switching button 130, and many other buttons such as up and down movement buttons, left and right movement buttons and a power button. In addition, although not shown, the remote controller 100 further includes a radio transmitter for transmitting signals generated through operation of various buttons thereof to an external digital broadcasting processing apparatus.

The channel input buttons 110 allow a user to input a channel number directly, and the channel search button 120 including an up key 120*a* and a down key 120*b* allows a user to search channels sequentially.

A digital broadcasting service using digital signals rather than existing analog signals offers a user various broadcasting signals through more channels. In the case of analog broadcasting, users may watch broadcasting programs through channels offered by regional transmitting stations that transmit broadcasting signals, which are called physical channels. In the case of digital broadcasting, users may watch broadcasting programs through virtual channels other than the physical channels offered by the transmitting stations. The virtual channel is a channel virtually made to receive the broadcasting signals at different regions from one broadcasting station with the same channel number. The virtual channel is divided into a major channel such as a physical signal, in which the broadcasting signals are received in a specified frequency band, and a plurality of minor channels contained in the major channel. The minor channel corresponds to a broadcasting signal received in the same frequency band as the major channel, but divided into a plurality of packets and transmitted in one frequency band in a broadcasting station. For example, a major channel number of '11' may contain a plurality of minor channel numbers of '11-1', '11-2', '11-3' and '11-4'. In this manner, since the digital broadcasting can transmit a plurality of programs in a single frequency band using an image compression technique, use efficiency of frequency bands is increased.

Returning to FIG. 1, it is common that the channel search button 120 provided in the remote controller 100 is a button used to search the minor channels. Assuming that one major channel contains about four minor channels and twenty major channels are received, for example, a user has to operate the channel search button 120 eighty times to search all channels in the remote controller 100. Accordingly, it is not practical for the user to search so many channels using only the up key 120*a* and the down key 120*b*.

The mode switching button 130 serves to select one of a major channel mode for searching major channels and a minor channel mode for searching minor channels. If the channel search button 120 is selected by the user before a predetermined period of time elapses after the mode switching button 130 is selected by the user, the current channel mode is switched to a different channel mode. In general, since the channel search button 120 is used to search the minor channels, major channels are searched when the user operates the up key 120*a* and the down key 120*b* of the channel search button 120 after the user selects the mode switching button 130.

On the contrary, after the mode switching button 130 is selected by the user, if buttons other than the channel search button 120 are selected by the user or the channel search button 120 is selected after a predetermined period of time elapses, the current channel mode is maintained without being switched to any different channel mode.

The user can search a desired channel without difficulty by means of the mode switching button 130.

Figure 2:
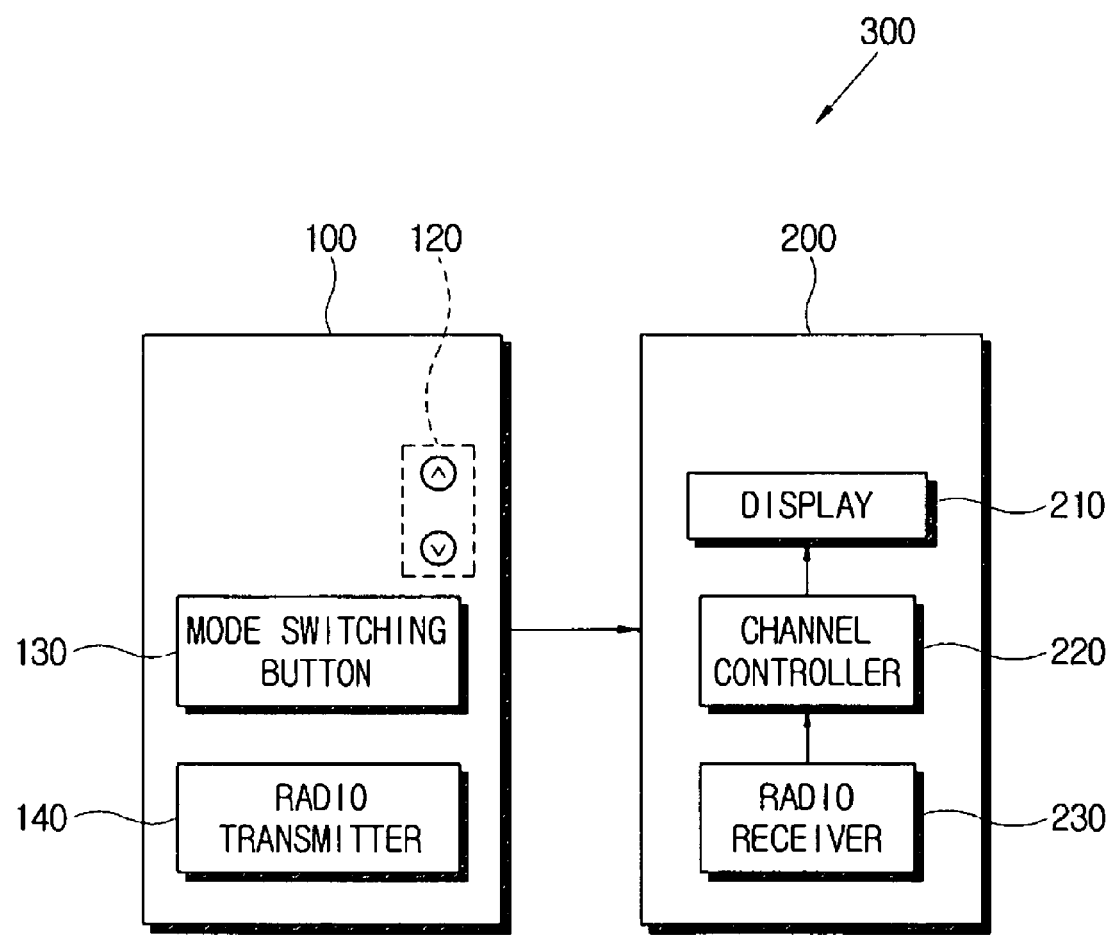
FIG. 2 is a control block diagram of an image system according to the first exemplary embodiment of the present invention.

FIG. 2 is a control block diagram of an image system according to the first exemplary embodiment of the present invention. As shown in FIG. 2, an image system 300 includes the remote controller 100 shown in FIG. 1 and a digital broadcasting processing apparatus 200.

The remote controller 100 has the same components as those shown in FIG. 1, and therefore, detailed explanation thereof will be omitted for the purpose of brevity of explanation.

When one among the mode switching button 130, the channel search button 120 and other buttons is selected, a radio transmitter 140 transmits function information about the selected one to a radio receiver 230 of the digital broadcasting processing apparatus 200 by wireless transmission. It is common that the function information is converted into a form of an infrared signal which can be transmitted wirelessly.

The digital broadcasting processing apparatus 200 includes a display 210, a channel controller 220 and the radio receiver 230.

The display 210 displays an image based on a broadcasting signal corresponding to a channel tuned by the channel controller 220. The display 210 includes a display module (not shown) on which an image is displayed and a module driver (not shown) for processing a broadcasting signal inputted from the outside to be displayed as an image on the display module. Here, the display module of the present invention may include various types of display modules such as a DLP (Digital Light Processing), an LCD (Liquid Crystal Display), a PDP (Plasma Display Panel), etc.

Further, the display 210 displays an OSD (on-screen display) window which shows the switched channel mode if the mode switching button 130 is selected and the channel mode is switched. The OSD window informs whether the current channel mode is the major channel mode or not.

If the display module is the DLP, the module driver may include an optical engine. If the display module is the LCD, the module driver may include a printed circuit board for converting a signal input from an image processing unit into a data signal and a gate signal. Likewise, the display 210 may have a configuration of the module driver according to the type of display module.

The radio receiver 230 receives a signal from the radio transmitter 140 of the remote controller 100 and outputs the received signal to the channel controller 220.

When the mode switching button 130 and the channel search button 120 are selected, the channel controller 220 receives information about selection of the mode switching and information about searched channels, switches a channel mode to be corresponded to the information, and tunes the channels sequentially. The channel controller 220 tunes the major channel if the major channel mode is selected through the mode switching button 130 and the channel search button 120 is selected, and the channel controller 220 tunes the minor channel if the minor channel mode is selected through the mode switching button 130 and the channel search button 120 is selected. That is, if the channel mode is switched by the mode switching button 130 of the remote controller 100, the channel controller 220 tunes the channels according to the switched channel mode.

Although not shown, the channel controller 220 includes a tuner for tuning channels in a predetermined order when it receives a control signal for channel search, and a memory in which the order of searched channels is stored.

Figure 3:
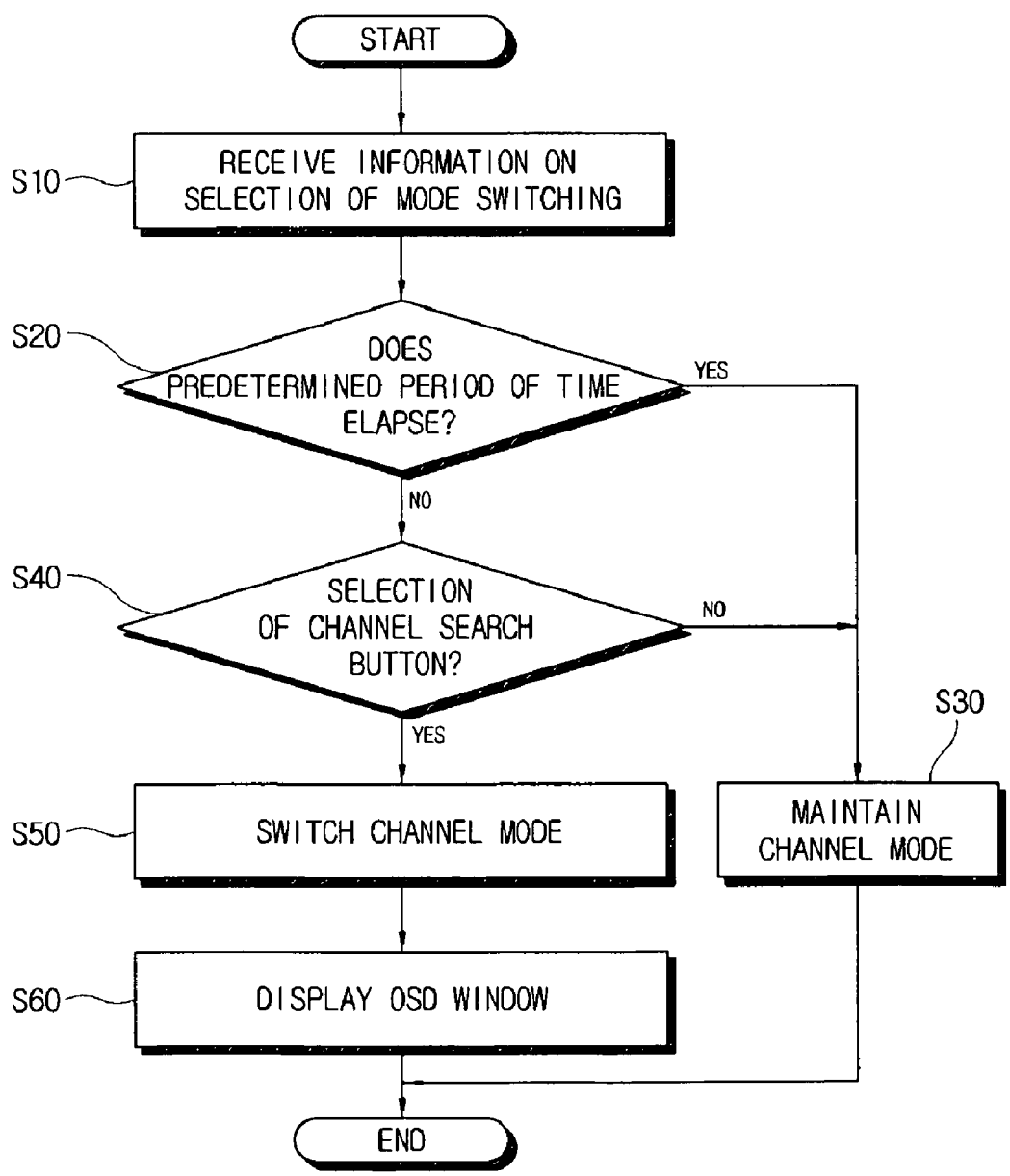
FIG. 3 is a control flowchart illustrating a control method of the image system according to the first exemplary embodiment of the present invention.

FIG. 3 is a control flow chart illustrating a control method of the image system according to the first exemplary embodiment of the present invention.

First, when the mode switching button 130 is selected by a user, the radio receiver 230 receives the information about selection of mode switching, at operation S10, and outputs the received information to the channel controller 220.

After the mode switching button 130 is selected, it is determined at operation S20 whether a predetermined period of time elapses. The predetermined period of time may be set to about three seconds by the user.

Then, at operation S40, the channel controller 220 determines whether a button selected within the predetermined period of time is the channel search button 120.

If the channel search button 120 is selected after the predetermined period of time elapses, a button other than the channel search button 120 is selected within the predetermined period of time, or no button is selected in the predetermined period of time, the channel mode remains unchanged, at operation S30.

On the contrary, when the mode switching button 130 is selected and the channel search button 120 is selected before the predetermined period of time elapses, the channel controller 226 tunes a channel specified by switching of the channel mode, at operation S50, and displays an image based on a broadcasting signal corresponding to the tuned channel on the display 210.

Then, at operation S60, the display 210 displays the OSD window indicating whether the current channel mode is the major channel mode or the minor channel mode.

Figure 4:
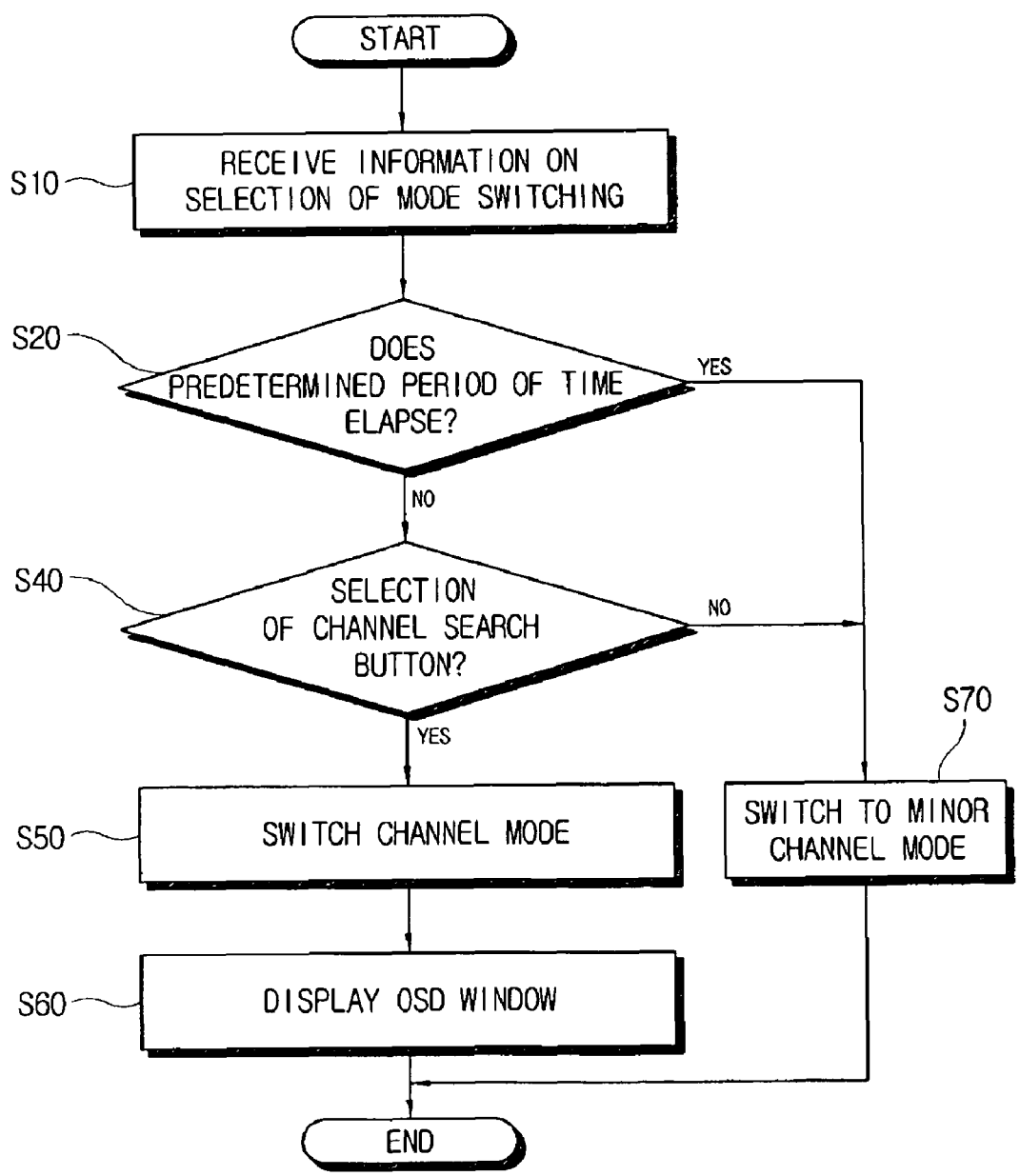
FIG. 4 is a control flowchart illustrating a control method of the image system according to a second exemplary embodiment of the present invention.

FIG. 4 is a control flow chart illustrating a control method of the image system according to a second exemplary embodiment of the present invention. The image system according to this exemplary embodiment may be the same as the first exemplary embodiment as shown FIGS. 1 and 2. However, the control method is different from the first exemplary embodiment.

As shown in FIG. 4, when the mode switching button 130 is selected and the channel search button 120 is selected before the predetermined period of time elapses, the channel controller 220 tunes a channel specified by switching of the channel mode, at operation S50. However, if the channel search button 120 is selected after the predetermined period of time elapses, a button other than the channel search button 120 is selected within the predetermined period of time, or no button is selected in the predetermined period of time, the channel mode is switched to a default channel mode. According to this exemplary embodiment, the default channel mode is the minor channel mode. Thus, if the predetermined period of time elapses after the mode switching button 130 is selected, the channel mode is switched to the minor channel mode, at operation S70.

Figure 5:
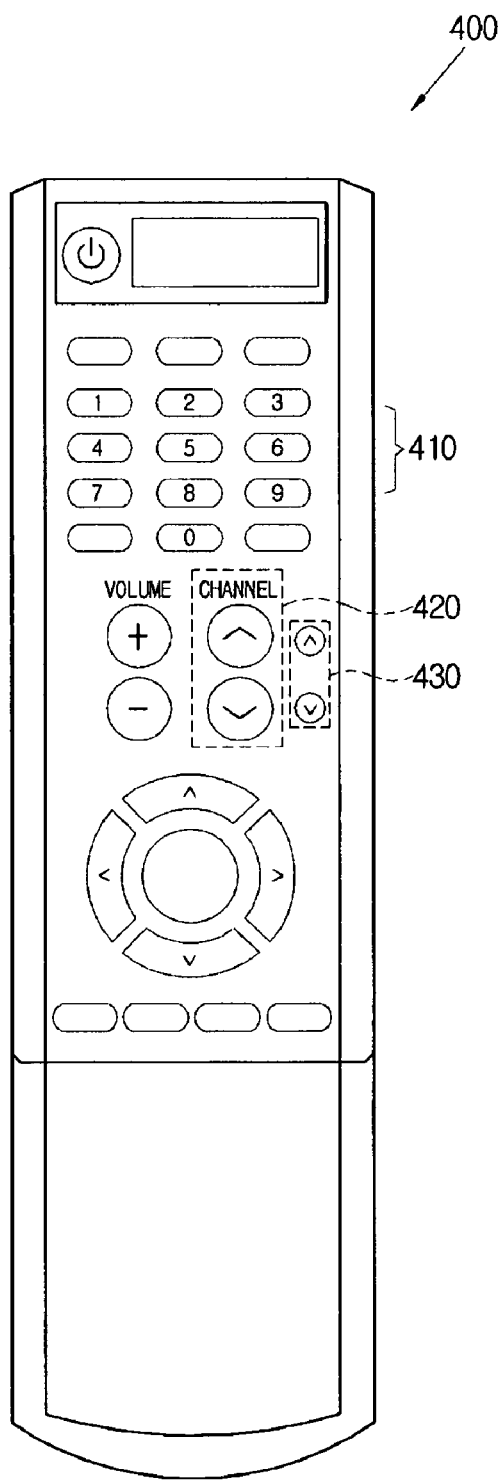
FIG. 5 is a front view of a remote controller according to a third exemplary embodiment of the present invention.

FIG. 5 is a front view of a remote controller 400 according to a third exemplary embodiment of the present invention. As shown in FIG. 5, the remote controller 400 includes a channel search button 420 for search of minor channels, and a major channel search button 430 for search of major channels.

The channel search button 420 may be called a minor channel search button since it is mainly used to search minor channels, providing the same function as the channel search button 120 according to the first exemplary embodiment.

The major channel search button 430 is a button used to search only major channels, each of which includes a plurality of minor channels of broadcasting channels. Since the remote controller 400 according to the third exemplary embodiment has a separate button used to search only the major channels, a user can freely select a desired channel using the channel search button 420 and the major channel search button 430.

According to an alternative exemplary embodiment, the remote controller may have both the mode switching button 130 in the first exemplary embodiment and the major channel search button 430 in the third exemplary embodiment. The channel controller of the image system including the remote controller according to the alternative embodiment tunes channels for each function corresponding to each button based on input information.

As apparent from the description, the present invention provides a remote controller allowing a user to select a channel without difficulty, and an image system comprising the same.

Although exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image system comprising;
    a digital broadcasting processing apparatus; and
    a remote controller which remotely controls the digital broadcasting processing apparatus,
    wherein the remote controller comprises a mode switching button for selecting one of a major channel mode and a minor channel mode, a channel search button for sequentially searching major channels and minor channels depending on the selected channel mode, and a radio transmitter which wirelessly transmits information about selection of the mode switching if the mode switching button is selected or information about a searched channel if the channel search button is selected, to the digital broadcasting processing apparatus, and
    wherein the digital broadcasting processing apparatus comprises a radio receiver which wirelessly receives the information and a channel controller which switches a channel mode to be tuned based on the information about the selection of the mode switching.

2. The image system according to claim 1, wherein the current channel mode is switched to a channel mode different from the current channel mode if the mode switching button is selected and the channel search button is selected before a predetermined period of time elapses.

3. A remote controller for remotely controlling an external digital broadcasting processing apparatus comprising a radio receiver, the remote controller comprising:
    a mode switching button for selecting one of a major channel mode and a minor channel mode;
    a channel search button for sequentially searching major channels and minor channels depending on the respective channel modes; and a radio transmitter which wirelessly transmits information about selection of the mode switching if the mode switching button is selected or information about a searched channel if the channel search button is selected, to the radio receiver.

4. An image system comprising:
a digital broadcasting processing apparatus; and
a remote controller which remotely controls the digital broadcasting processing apparatus,
wherein the remote controller comprises a major channel search button for sequentially searching major channels in a predetermined order, a minor channel search button for sequentially searching minor channels in a predetermined order, and a radio transmitter which wirelessly transmits information about a searched major channel or a searched minor channel if the major channel search button or the minor channel search button is selected, to the digital broadcasting processing apparatus, and
wherein the digital broadcasting processing apparatus comprises a radio receiver which wirelessly receives the information, and a channel controller which tunes the searched major channel or the searched minor channel based on the information about the searched major channel or the information about the searched minor channel,
wherein the remote controller further comprises a mode switching button for selecting one of a major channel mode for searching the major channels and a minor channel mode for searching the minor channels.

5. The image system according to claim 4,
wherein the channel controller switches a channel mode to be tuned based on information about selection of mode switching.

6. A remote controller for remotely controlling an external digital broadcasting processing apparatus comprising a radio receiver, the remote controller comprising:
a major channel search button for sequentially searching major channels in a predetermined order;
a minor channel search button for sequentially searching minor channels in a predetermined order; a radio transmitter which wirelessly transmits information about a searched major channel or a searched minor channel if the major channel search button or the minor channel search button is selected, to the radio receiver; and
a mode switching button for selecting one of a major channel mode for searching the major channels and a minor channel mode for searching the minor channels, and
wherein the radio transmitter wirelessly transmits information about the selection of mode switching, to the radio receiver.

7. A method of controlling an image system comprising a digital broadcasting processing apparatus and a remote controller comprises a mode switching button for selecting one of a major channel mode and a minor channel mode, a channel search button for sequentially searching major channels and minor channels depending on the selected channel mode, the method comprising:
selecting the mode switching button;
switching a current channel mode to a channel mode different from the current channel mode if the channel search button is selected before a predetermined period of time elapses; and
searching the major channels or the minor channels depending on the switched channel mode.

8. The method according to claim 7, wherein the current channel mode is not switched if the channel search button is not selected before a predetermined period of time elapses.

9. An image system comprising;
a digital broadcasting processing apparatus; and
a remote controller which remotely controls the digital broadcasting processing apparatus,
wherein the remote controller comprises a mode switching button for selecting one of a major channel mode and a minor channel mode, and a channel search button for sequentially searching major channels and minor channels depending on the selected channel mode, and
wherein the digital broadcasting processing apparatus tunes the major channel or the minor channel based on the selected channel mode.

10. The image system according to claim 9, wherein the current channel mode is switched to a channel mode different from the current channel mode if the mode switching button is selected and the channel search button is selected before a predetermined period of time elapses.

11. The image system according to claim 9, wherein the current channel mode is not switched if a predetermined period of time elapses after the mode switching button is selected.

12. The image system according to claim 11, wherein the major channel mode is switched to the minor channel mode if a predetermined period of time elapses after the major channel mode is selected by the mode switching button.

13. The image system according to claim 9, wherein the digital broadcasting processing apparatus further comprises a display, and
the display displays an OSD window indicating the current channel mode if the mode switching button is selected.

14. A method of controlling an image system comprising a digital broadcasting processing apparatus and a remote controller, comprises a mode switching button for selecting one of a major channel mode and a minor channel mode, a channel search button for sequentially searching major channels and minor channels depending on the selected channel mode, the method comprising:
selecting the mode switching button;
tuning the major channel or the minor channel based on the selected channel mode.

15. The method according to claim 14, after selecting the mode switching button further comprising:
switching the current channel mode to a channel mode different from the current channel mode if the channel search button is selected before a predetermined period of time elapses; and
searching the major channel or the minor channels depending on the switched channel mode.

16. The method according to claim 14, wherein the current channel mode is switched to a channel mode different from the current channel mode if the mode switching button is selected and the channel search button is selected before a predetermined period of time elapses.

17. The method according to claim 16, wherein the major channel mode is switched to the minor channel mode if a predetermined period of time elapses after the major channel mode is selected by the mode switching button.

18. The method according to claim 14, wherein the digital broadcasting processing apparatus further comprises a display, further comprising:
displaying an OSD window indicating the current channel mode if the mode switching button is selected on the display.

* * * * *